US012362771B2

(12) United States Patent
Seo et al.

(10) Patent No.: US 12,362,771 B2
(45) Date of Patent: Jul. 15, 2025

(54) ELECTRONIC DEVICE FOR PERFORMING WIRELESS COMMUNICATION AND OPERATION METHOD THEREOF

(71) Applicant: SAMSUNG ELECTRONICS CO., LTD., Suwon-si (KR)

(72) Inventors: Jehwan Seo, Suwon-si (KR); Yongjin Kang, Suwon-si (KR); Sanggi Oh, Suwon-si (KR); Hyungyong Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 379 days.

(21) Appl. No.: 17/949,539

(22) Filed: Sep. 21, 2022

(65) Prior Publication Data

US 2023/0060161 A1     Mar. 2, 2023

Related U.S. Application Data

(63) Continuation of application No. PCT/KR2022/010409, filed on Jul. 18, 2022.

(30) Foreign Application Priority Data

Aug. 27, 2021 (KR) .......................... 10-2021-0113921

(51) Int. Cl.
*H04W 72/00* (2023.01)
*H04B 1/00* (2006.01)
(Continued)

(52) U.S. Cl.
CPC ............. *H04B 1/006* (2013.01); *H04B 1/405* (2013.01); *H04W 76/15* (2018.02)

(58) Field of Classification Search
CPC .......... H04B 1/006; H04B 1/405; H04B 1/00; H04B 1/04; H04B 1/401; H04B 1/50;
(Continued)

(56) References Cited

U.S. PATENT DOCUMENTS 9,084,139 B2    7/2015  Damodaran et al.
10,979,106 B2   4/2021  Liu et al.
(Continued)

FOREIGN PATENT DOCUMENTS

CN    112929972       6/2021
EP    4184602 A1 *   5/2023    .............. B01J 13/06
(Continued)

OTHER PUBLICATIONS

International Search Report for PCT/KR2022/010409 mailed Oct. 14, 2022, 3 pages.
(Continued)

*Primary Examiner* — Tanmay K Shah
(74) *Attorney, Agent, or Firm* — NIXON & VANDERHYE P.C.

(57) ABSTRACT

An electronic device and an operation method thereof are disclosed. The disclosed electronic device may include: a processor, a memory configured to store at least one instruction executable by the processor, and a communicator, wherein the communicator may include a first antenna, a second antenna, a first filter configured to allow a radio frequency (RF) signal in a first frequency band to pass therethrough, and a second filter configured to allow an RF signal in a second frequency band to pass therethrough, and the processor is configured, in response to the at least one instruction being executed by the processor, to: connect to an access point using one of the first frequency band, the second frequency band, and a third frequency band, and control a connection between the first antenna and the first filter and a connection between the second antenna and the second filter based on a communication channel between the electronic device and the access point and a communication channel of a peer-to-peer (P2P) connection, in response to performing the P2P connection with a peripheral device.

18 Claims, 11 Drawing Sheets

(51) Int. Cl.
*H04B 1/405* (2015.01)
*H04W 76/15* (2018.01)

(58) Field of Classification Search
CPC ... H04B 1/0064; H04B 1/0458; H04W 76/15; H04W 88/04; H04W 76/14
USPC ..................................................... 455/552.1
See application file for complete search history.

(56) References Cited

U.S. PATENT DOCUMENTS

| | | | | |
|---|---|---|---|---|
| 2019/0305812 | A1* | 10/2019 | Kolsrud | H04B 17/318 |
| 2019/0327740 | A1* | 10/2019 | Verma | H04L 5/008 |
| 2020/0120453 | A1* | 4/2020 | Kim | H04W 72/02 |
| 2021/0185746 | A1* | 6/2021 | Mullati | H04W 76/12 |

FOREIGN PATENT DOCUMENTS

| | | |
|---|---|---|
| JP | 2015-70568 | 4/2015 |
| KR | 10-1546931 | 8/2015 |
| KR | 10-2018-0030828 | 3/2018 |
| KR | 10-2018-0099267 | 9/2018 |
| KR | 10-2020-0041662 | 4/2020 |
| WO | 2012/107656 | 8/2012 |
| WO | 2017/014923 | 1/2017 |

OTHER PUBLICATIONS

Extended European Search Report dated Oct. 1, 2024 issued in European Patent Application No. 22861551.4.

* cited by examiner

ELECTRONIC DEVICE FOR PERFORMING WIRELESS COMMUNICATION AND OPERATION METHOD THEREOF

CROSS-REFERENCE TO RELATED APPLICATIONS

This application is a continuation of International Application No. PCT/KR2022/010409 designating the United States, filed on Jul. 18, 2022, at the Korean Intellectual Property Receiving Office and claiming priority to Korean Patent Application No. 10-2021-0113921 filed on Aug. 27, 2021, at the Korean Intellectual Property Office, the disclosures of which are incorporated by reference herein in their entireties.

BACKGROUND

1. Field

The disclosure relates to an electronic device for performing wireless communication and an operation method thereof.

2. Description of Related Art

Wireless fidelity (Wi-Fi) is a technology that enables electronic devices to connect to a wireless local area network (WLAN), and mainly uses a 2.4 GHz band and a 5 GHz band. Devices that use Wi-Fi technology include personal computers, game consoles, smartphones, digital cameras, tablet computers, and printers. Wi-Fi compatible devices may access the Internet through WLAN networks and wireless access points.

Among wireless communication technologies, peer-to-peer (P2P) communication refers to direct communication between terminals without a server. The terminals may transmit and receive files therebetween through P2P communication without particular limits or separate servers.

An electronic device may perform P2P communication with other electronic devices in a state of being connected to a WLAN through a dual-band dual-concurrent (DBDC) operation that enables the electronic device to communicate simultaneously with a plurality of devices through two different frequency bands.

SUMMARY

Embodiments of the disclosure may improve performance of a DBDC operation for P2P communication in a 5 GHz frequency band when an electronic device is connected to a 6 GHz frequency band to perform Wi-Fi communication.

According to an example embodiment, an electronic device may include: a processor, a memory configured to store at least one instruction executable by the processor, and a communicator including a first antenna, a second antenna, a first filter configured to allow a radio frequency (RF) signal in a first frequency band to pass therethrough, and a second filter configured to allow an RF signal in a second frequency band to pass therethrough, wherein the processor is configured, in response to the at least one instruction being executed by the processor: connect to an access point using one of the first frequency band, the second frequency band, and a third frequency band, and control a connection between the first antenna and the first filter and a connection between the second antenna and the second filter based on a communication channel between the electronic device and the access point and a communication channel of a peer-to-peer (P2P) connection in response to performing the P2P connection with a peripheral device, the second frequency band may be a frequency band higher than the first frequency band, and the third frequency band may be a frequency band lower than the first frequency band.

According to an example embodiment, a method of operating an electronic device including a first antenna, a second antenna, a first filter configured to allow a radio frequency (RF) signal in a first frequency band to pass therethrough, and a second filter configured to allow an RF signal in a second frequency band to pass therethrough may include: connecting to an access point using one of a first frequency band, a second frequency band, and a third frequency band, performing a peer-to-peer (P2P) connection with a peripheral device, setting a connection between the first antenna and the first filter and a connection between the second antenna and the second filter based on a communication channel between the electronic device and the access point and a communication channel of the P2P connection, and performing communication with the access point and the peripheral device based on the set connection between the first antenna and the first filter and the set connection between the second antenna and the second filter, wherein the second frequency band may be a frequency band higher than the first frequency band, and the third frequency band may be a frequency band lower than the first frequency band.

According to various disclosed example embodiments, in response to being connected to a 6 GHz frequency band to perform Wi-Fi communication, an electronic device may improve performance of a DBDC operation by improving P2P communication performance in a 5 GHz frequency band, which is more robust to interference than a 2.4 GHz frequency band and is capable of transmitting a large amount of data.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Figure 1:
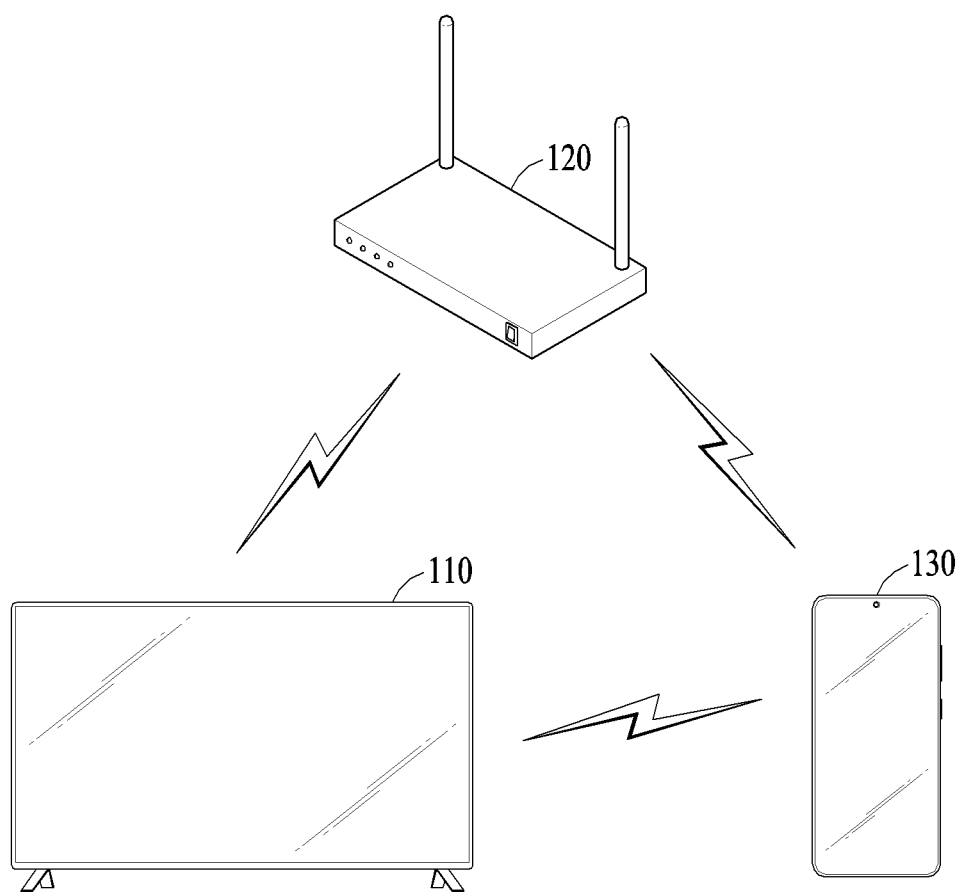
FIG. 1 is a diagram illustrating an overview of an example wireless communication system including an electronic device, an access point, and a peripheral device according to various embodiments.

Hereinafter, various example embodiments will be described in greater detail with reference to the accompanying drawings. When describing the example embodiments with reference to the accompanying drawings, like reference numerals refer to like elements and any repeated description related thereto may not be provided.

Although the terms "first" or "second" are used to explain various components, the components are not limited to the terms. These terms are used simply to distinguish one component from another component. For example, a first component may be referred to as a second component, or similarly, the second component may be referred to as the first component within the scope of the present disclosure. The term "and/or" includes any one or any combination of the associated listed terms.

In example embodiments, the term "user" may refer, for example, to a person who controls a function or operation of an electronic device, or a person who controls a function or operation of a peripheral device. A user may include a manager or an installation engineer.

FIG. 1 is a diagram illustrating an overview of an example wireless communication system including an electronic device, an access point, and a peripheral device according to various embodiments.

Referring to FIG. 1, an electronic device 110 may be connected to an access point 120 to perform wireless fidelity (Wi-Fi) communication. In addition, the electronic device 110 may perform peer-to-peer (P2P) communication with a peripheral device 130 located near the electronic device 110. The P2P communication may be performed through, for example, a wireless communication scheme, such as Wi-Fi direct, Bluetooth, and long term evolution (LTE) direct. The electronic device 110 may access the Internet through Wi-Fi communication provided by the access point 120, and may directly transmit and receive a file or data to and from the peripheral device 130 through the P2P communication. Performing the P2P communication involves a process of discovering a device capable of performing P2P communication, transmitting a request for a connection, and accepting the connection.

Although FIG. 1 illustrates one peripheral device 130, the electronic device 110 may perform P2P communication with each of a plurality of peripheral devices 130 according to an example embodiment. In addition, although FIG. 1 illustrates that both the electronic device 110 and the peripheral device 130 connect to the access point 120, the electronic device 110 and the peripheral device 130 may each connect to a different access point, and the peripheral device 130 may not connect to the access point 120.

The electronic device 110 is a device capable of performing wireless communication with the access point 120 and the peripheral device 130, and the peripheral device 130 is a device capable of performing P2P communication with the electronic device 110. The electronic device 110 and the peripheral device 130 may be a television, a smartphone, a tablet computer, a notebook computer, a desktop computer, a set-top box, home appliances, a personal digital assistant (PDA), or a wearable device, but the examples are not limited thereto. Hereinafter, for ease of description, a television is provided as an example of the electronic device 110, and a smartphone is provided as an example of the peripheral device 130.

The electronic 110 may be wirelessly connected to the peripheral device 130 through the P2P communication in a state of being connected with the access point 120. The electronic device 110 and the peripheral device 130 support a concurrent connection, and may simultaneously perform wireless communication with a plurality of devices through one frequency band or different frequency bands. The concurrent connection may include single channel concurrency (SCC), dual-band dual-concurrent (DBDC), and multi-channel concurrency (MCC). SCC may refer, for example, to a connection in which frequency bands of two communication channels used for a wireless connection are identical to each other when a device is wirelessly connected to two different devices at the same time. DBDC may refer, for example, to a connection in which frequency bands of two communication channels used for a wireless connection are different from each other when a device is wirelessly connected to two different devices at the same time. MCC may refer, for example, to a device communicating with different devices using different communication channels through a time division scheme. The electronic device 110 may perform DBDC, for example, by simultaneously performing Wi-Fi communication with the access point 120 in a 5 gigahertz (GHz) frequency band and P2P communication with the peripheral device 130 in a 2.4 GHz frequency band.

In an example embodiment, the electronic device 110 may communicate with the access point 120 through a communication channel in one of a first frequency band, a second frequency band, and a third frequency band, and may perform the P2P communication with the peripheral device 130 through a communication channel in the first frequency band or the third frequency band. The first frequency band may include the 5 GHz frequency band, the second frequency band may include a 6 GHz frequency band, and the third frequency band may include the 2.4 GHz frequency band. The peripheral device 130 may transmit a P2P connection request signal to the electronic device 110 using the 2.4 GHz or 5 GHz frequency band to perform the P2P communication, and the electronic device 110 may accept the P2P connection request by the peripheral device 130 to perform the P2P communication with the peripheral device 130 through the 2.4 GHz or 5 GHz frequency band.

The electronic device 110 may support Wi-Fi communication with the access point 120 not only in the 2.4 GHz and 5 GHz frequency bands but also in the 6 GHz frequency band using Wi-Fi 6E technology among Wi-Fi 802.11ax standard technologies. A communication channel in a high frequency band may be used to perform communication because using a higher frequency band as a communication channel enables communication to be more robust to interference and increases the amount of data that may be transmitted (or the rate at which data can be transmitted). The electronic device 110 may improve performance of Wi-Fi communication by performing communication with the access point 120 using a communication channel in the 6 GHz frequency band instead of using a communication channel in the 2.4 GHz or 5 GHz frequency band. This is because fewer wireless communication devices use the 6 GHz frequency band to perform wireless communication, compared to the 2.4 GHz and 5 GHz frequency bands, and accordingly there may be less interference and fewer collisions, increasing a transmission speed and providing better performance even in a shaded area.

Meanwhile, wireless communication being performed in the 6 GHz frequency band and wireless communication being performed in the 5 GHz frequency band may interfere with each other due to proximity of the frequency bands to each other, and thus, simultaneously performing the wireless communication using the 6 GHz frequency band and the wireless communication using the 5 GHz frequency band may cause interference, resulting in a decrease in communication performance. According to various example embodiments described below, even when the electronic device 110 that is connected to the 6 GHz frequency band to perform Wi-Fi communication simultaneously performs the P2P communication in the 5 GHz frequency band, it may be possible to improve communication performance (e.g., to improve throughput) of DBDC through a technical solution for reducing an impact of interference. Embodiments of the disclosure address the shortcomings described above will be described in greater detail below.

Figure 2A:
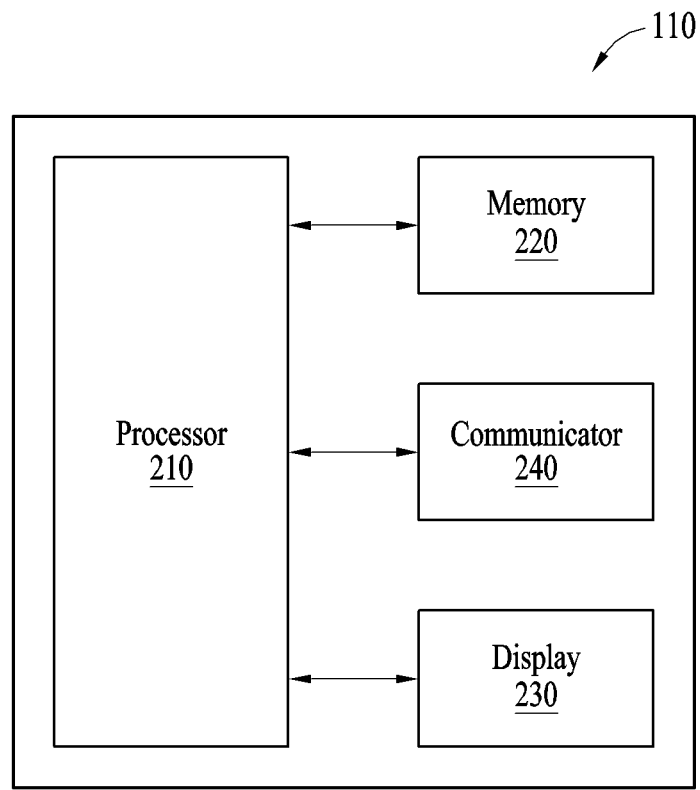
FIG. 2A is a block diagram illustrating an example configuration of an electronic device according to various embodiments.
Figure 2B:
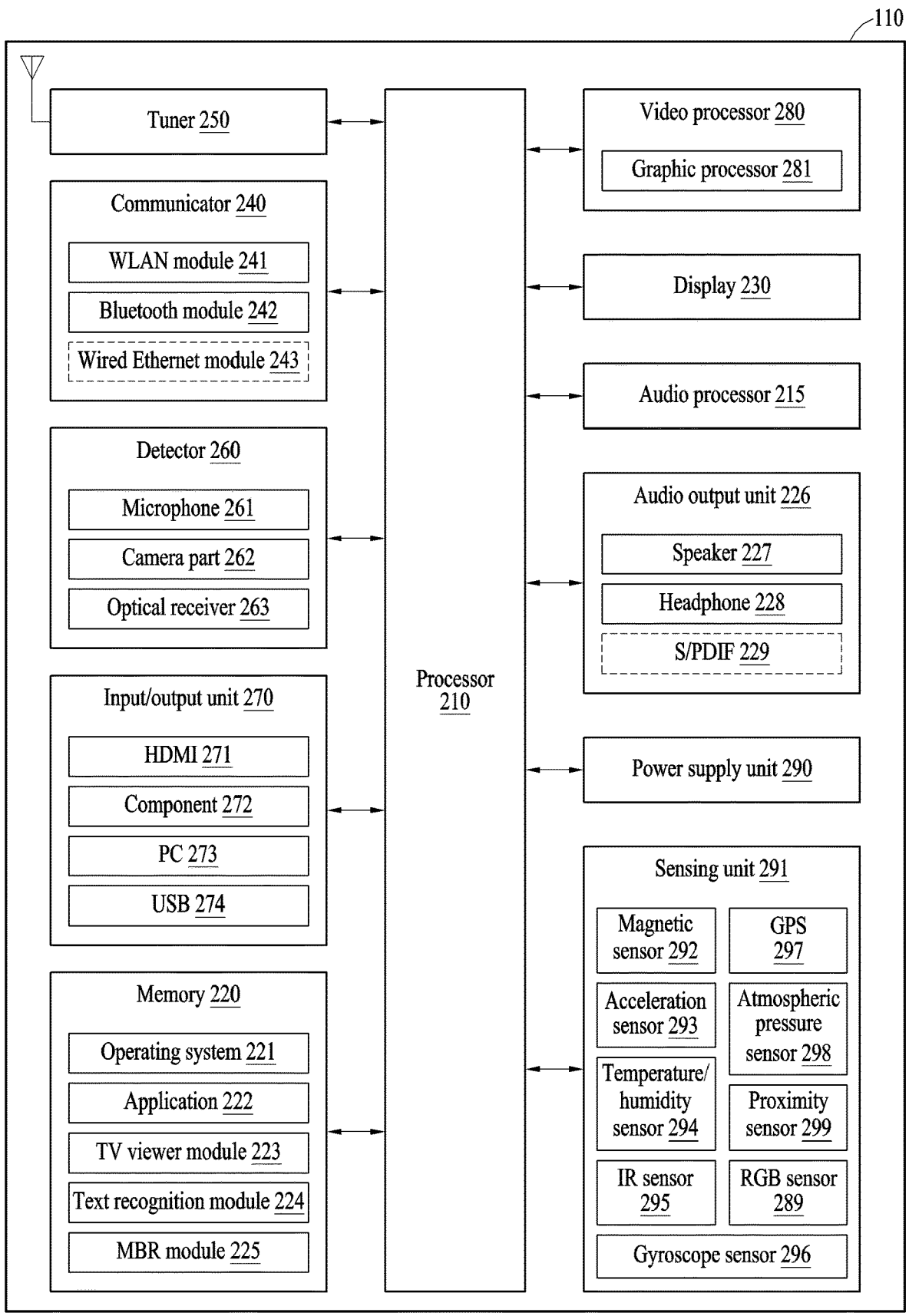
FIG. 2B is a block diagram illustrating an example configuration of an electronic device according to various embodiments.

FIG. 2A is a block diagram illustrating an example configuration of an electronic device according to various embodiments. FIG. 2B is a block diagram illustrating an example configuration of an electronic device according to various embodiments.

As illustrated in FIG. 2A, the electronic device 110 may include a processor (e.g., including processing circuitry) 210, a memory 220, a display 230, and a communicator (e.g., including communication circuitry) 240. However, not all components illustrated in FIG. 2A are essential components. The display device 110 may be implemented with more components than the illustrated components, and the display device 110 may be implemented with less components.

For example, as illustrated in FIG. 2B, the electronic device 110 may further include a sensing unit (e.g., including at least one sensor) 291, a tuner 250, a detector (e.g., including detecting circuitry) 260, an input/output (I/O) unit (e.g., including input/output circuitry) 270, a video processor (e.g., including video processing circuitry) 280, an audio processor (e.g., including audio processing circuitry) 215, an audio output unit (e.g., including audio output circuitry) 226, and a power supply unit (e.g., including a power supply) 290 as well as the memory 220, the processor (e.g., including processing circuitry) 210, the communicator (e.g., including communication circuitry) 240, and the display 230.

Hereinafter, the components stated above are described in greater detail.

The processor 210 may include various processing circuitry and control overall operations of the display device 110 and a flow of a signal between internal components of the display device 110, and may process data. The processor 210 may execute various applications and an operation system (OS) stored in the memory 220, in response to a user input or when a preset and stored condition is satisfied.

The processor 210 may include a graphics processing unit (GPU) (not shown) to process graphics corresponding to a video. The processor 210 may be implemented as a System on Chip (SoC) in which the GPU (not shown) is integrated with a core (not shown). The processor 210 may include a single core, a dual core, a triple core, a quad core, and a multi core.

The processor 210 may include a plurality of processors. For example, the processor 210 may be implemented as a main processor (not shown) and a sub-processor (not shown) that operates in a sleep mode.

The memory 220 may store various pieces of data, a program, and an application 222 for driving and controlling the electronic device 110, under the control of the processor 210, or may store at least one instruction executable by the processor 210. The memory 220 may store data or input/output signals corresponding to driving of the video processor 280, the display 230, the audio processor 215, the audio output unit 226, the power supply unit 290, the tuner 250, the communicator 240, the detector 260, and the I/O unit 270.

The memory 220 may store an operating system 221 for controlling the electronic device 110 and the processor 210, the application 222 initially provided by a manufacturer or externally downloaded, a graphical user interface (GUI) related to the application 222, an object (e.g., an image text, an icon, a button, and the like) for providing the GUI, user information, a document, a database, and related data.

In addition, the memory 220 may include a television (TV) viewer module 223 including one or more instructions to receive an input signal from a remote control device (not shown) and thereby perform channel control corresponding to the input signal, or enter a channel scroll user interface mode when the input signal corresponds to a preset input, a text recognition module 224 including one or more instructions to recognize information from content received from an external device (not shown), and a membrane bioreactor (MBR) module 225 including one or more instructions to control a channel from an external device (not shown).

The memory 220 may include read-only memory (ROM), random-access memory (RAM), a memory card (e.g., a micro secure digital (SD) card and a universal serial bus (USB) memory, which are not shown) mounted to the display device 110. In addition, the memory 220 may include a non-volatile memory, a volatile memory, a hard disk drive (HDD), or a solid state drive (SSD).

The memory 220 may include at least one type of storage media of a flash memory type, a hard disk type, a multimedia card micro type, a card type memory (e.g., an SD or extreme digital (XE) memory), RAM, static RAM, ROM, electrically erasable programmable ROM (EEPROM), programmable ROM (PROM), a magnetic memory, a magnetic disk, and an optical disk.

The display 230 may display a video included in a broadcast signal received through the tuner 250 on a screen under the control of the processor 210. In addition, the display 230 may display content (e.g., a moving image) input through the communicator 240 or the I/O unit 270. The display 230 may output an image stored in the memory 220 under the control of the processor 210.

The display 230 may generate a driving signal by converting an image signal, a data signal, an on-screen display (OSD) signal, and a control signal processed by the processor 210. The display 230 may be implemented as a plasma display panel (PDP), a liquid crystal display (LCD), an organic light-emitting diode (OLED), a cathode ray tube (CRT), and a flexible display. The display 230 may be implemented as a three-dimensional (3D) display. In addition, the display 230 may be used as an input device as well as an output device by being configured as a touchscreen.

The tuner 250 may tune and select a frequency of a channel the electronic device 110 desires to receive among various radio wave elements through performing amplification, mixing, and resonance on a broadcast signal that is received by wire or wirelessly. The broadcast signal may include audio, a video, and additional information (e.g., an electronic program guide (EPG)).

The tuner 250 may receive the broadcast signal from a frequency band corresponding to a channel number according to a user input (e.g., a control signal received from a remote control device (not shown), that is, a channel number input, an up-down input of a channel, and a channel input on an EPG screen).

The tuner 250 may receive broadcast signals from various sources, such as terrestrial broadcast, cable broadcast, satellite broadcast, and Internet broadcast. The tuner 250 may receive the broadcast signal from a source, such as an analog broadcast or a digital broadcast. The broadcast signal received by the tuner 250 may be separated into audio, video, and/or additional information by decoding (e.g., audio decoding, video decoding, or additional information decoding). The separated audio, video, and/or additional information may be stored in the memory 220 under the control of the processor 210.

One or a plurality of tuners 250 of the electronic device 110 may be provided. The tuner 250 may be implemented as an all-in-one with the electronic device 110, or implemented as a separate device (e.g., a set-top box, which is not shown, including a tuner, which is not shown, connected to the I/O unit 270) that includes a tuner electrically connected to the electronic device 110.

The communicator 240 may include various communication circuitry and connect the electronic device 110 to an external device (e.g., the access point 120 and/or the peripheral device 130 of FIG. 1) under the control of the processor 210. The processor 210 may transmit/receive content to/from the external device (not shown) connected through the communicator 240, may download the application 222 from the external device (not shown), or may perform web browsing. The communicator 240 may include one or more of a wireless local area network (LAN) module 241, a Bluetooth module 242, and a wired Ethernet module 243 corresponding to performance and a structure of the electronic device 110. In addition, the communicator 240 may include a combination of the wireless LAN module 241, the Bluetooth module 242, and the wired Ethernet module 243. The communicator 240 may perform Wi-Fi communication with an access point through the wireless LAN module 241 and may perform P2P communication with a peripheral device.

In addition, the communicator 240 may receive a control signal of a remote control device (not shown) under the control of the processor 210. The control signal may be implemented as a Bluetooth type, a radio frequency (RF) signal type, or a Wi-Fi type. In addition, the communicator 240 may further include a module for another form of short-range communication (e.g., near field communication (NFC) and Bluetooth low energy (BLE)) other than the Bluetooth module 242.

The detector 260 may include various detecting circuitry and detect voice, an image, or an interaction of a user, and may include a microphone 261, a camera part 262, and an optical receiver 263. The microphone 261 may receive an uttered voice of the user. The microphone 261 may convert the received voice into an electrical signal and may output the electrical signal to the processor 210. The voice of the user may include, for example, a voice corresponding to a menu item or a function of the electronic device 110.

The camera part 262 may obtain an image, such as a still image or a moving image. An image captured by the camera part 262 may be processed through the processor 210 or a separate image processor (not shown). The image obtained by the camera part 262 may be stored in the memory 220 or may be transmitted to outside through the communicator 240. Two or more camera parts 262 may be provided based on a configuration of the electronic device 110.

The optical receiver 263 may receive an optical signal (including a control signal) received from an external remote control device (not shown). The optical receiver 263 may receive an optical signal corresponding to a user input (e.g., a touch, a press, a touch gesture, a voice, or a motion) from a remote control device (not shown). A control signal may be extracted from the received optical signal under the control of the processor 210. For example, the optical receiver 263 may receive a control signal corresponding to a channel up/down button for changing a channel, from the remote control device (not shown).

The I/O unit 270 may include various input/output circuitry and receive a video (e.g., a moving image), audio (e.g., a voice, music, and the like), and additional information (e.g., an EPG, and the like) from outside of the electronic device 110 under the control of the processor 210. The I/O unit 270 may include at least one of a high-definition multimedia interface (HDMI) port 271, a component jack 272, a personal computer (PC) port 273, and a USB port 274. The I/O unit 270 may include any combination of the HDMI port 271, the component jack 272, the PC port 273, and the USB port 274. An external image providing device (not shown) may be connected through the HDMI port 271.

The video processor 280 may include various video processing circuitry and process video data received by the electronic device 110. In the video processor 280, various image processing may be performed on video data, such as decoding, scaling, noise filtering, bezel rate conversion, and resolution conversion.

A graphic processor 281 may generate a screen including various objects, such as an icon, an image, and text using an operator (not shown) and a renderer (not shown). The operator (not shown) may calculate an attribute value, such as a color, a size, a shape, a coordinate value to display each object based on a layout of a screen using a user input that is detected by the detector 260. The renderer (not shown) may generate screens in various layouts including an object based on the attribute value calculated by the operator (not shown). The screen generated by the renderer (not shown) may be displayed on a display area of the display 230.

The audio processor 215 may include various audio processing circuitry and process audio data. The audio processor 215 may perform various processing on the audio data, such as decoding, amplification, and noise filtering. Meanwhile, the audio processor 215 may include a plurality of audio processing modules to process audio corresponding to a plurality of content.

The audio output unit 226 may include various audio output circuitry and output audio included in the broadcast signal received through the tuner 250 under the control of the processor 210. The audio output unit 226 may output audio (e.g., voice, sound) input through the communicator 240 or I/O unit 270. In addition, the audio output unit 226 may output audio stored in the memory 220 under the control of the processor 210. The audio output unit 226 may include at least one of a speaker 227, a headphone output terminal 228, and a Sony/Philips digital interface (S/PDIF) output terminal 229. The audio output unit 226 may include any combination of the speaker 227, the headphone output terminal 228, and the S/PDIF output terminal 229.

The power supply unit 290 may include a power supply and supply power input from an external power source to the components inside the electronic device 110 under the control of the processor 210. In addition, the power supply unit 290 may supply power output from one or more batteries (not shown) placed inside the electronic device 110 to the components inside the electronic device 110 under the control of the processor 210.

The sensing unit 291 may include at least one sensor and sense a state of the electronic device 110 or a state around the electronic device 110, and may provide the information obtained by sensing to the processor 210. The sensing unit 291 may include at least one of a magnetic sensor 292, an acceleration sensor 293, a temperature/humidity sensor 294, an infrared (IR) sensor 295, a gyroscope sensor 296, a position sensor (e.g., global positioning system (GPS)) 297, an atmospheric pressure sensor 298, a proximity sensor 299, and a red, green, blue (RGB) sensor 289 (e.g., an illuminance sensor), however, the examples are not limited thereto. Since one skilled in the art may intuitively infer a function of each sensor from its name, a detailed description thereof is omitted.

In addition, the electronic device 110 may be implemented as an analog TV, a digital TV, a 3D-TV, a smart TV, an LED TV, an OLED TV, a plasma TV, and a monitor; however, one skilled in the art will understand that the examples are not limited thereto.

Meanwhile, the illustrated block diagram of the electronic device 110 is a block diagram for an example embodiment. Each component of the block diagram may be integrated, added, or omitted based on actually implemented specifications of the electronic device 110. For example, two or more components may be combined into one component, or one component may be divided into two or more components, as necessary. In addition, any mention of a function performed by each block is for describing example embodiments, and a detailed operation thereof or a device does not limit the scope of an example embodiment.

According to an example embodiment, the electronic device 110 may be wirelessly connected to an access point and/or a peripheral device through the communicator 240. The communicator 240 may include a first antenna (e.g., a first antenna 572 of FIG. 5), a second antenna (e.g., a second antenna 574 of FIG. 5), a first filter (e.g., a first filter 552 of FIG. 5) that allows an RF signal in a first frequency band to pass therethrough, and a second filter (e.g., a second filter 554 of FIG. 5) that allows an RF signal in a second frequency band to pass therethrough. The first filter may be a low pass filter (LPF) that allows the RF signal in the first frequency band or lower to pass therethrough, and the second filter may be a high pass filter (HPF) that allows the RF signal in the second frequency band or higher to pass therethrough.

The communicator 240 may simultaneously perform wireless communication in two of the first frequency band, the second frequency band, and a third frequency band. The first frequency band may include a 5 GHz frequency band, the second frequency band may include a 6 GHz frequency band, and the third frequency band may include a 2.4 GHz frequency band. The communicator 240 may be connected to an access point using one of the first frequency band, the second frequency band, and the third frequency band, and may perform P2P communication with a peripheral device using one of the first frequency band and the third frequency band.

The communicator 240 may include first switches (e.g., first switches 542 and 544 of FIG. 5) for controlling a connection of a signal transmission path including the first filter and second switches (e.g., second switches 546 and 548 of FIG. 5) for controlling a connection of a signal transmission path including the second filter, and the processor 210 may control a connection of the first switches and a connection of the second switches based on a connection control signal. In response to the electronic device 110 performing a P2P connection with a peripheral device, the processor 210 may control a connection between the first antenna and the first filter and a connection between the second antenna and the second filter based on a communication channel between the electronic device 110 and the access point and a communication channel of the P2P connection with the peripheral device.

In response to connecting with the access point before performing the P2P connection with the peripheral device, the processor 210 may control the connection between the first antenna and the first filter and the connection between the second antenna and the second filter to prevent/block an RF signal from passing through the first filter and the second filter.

In response to the communication channel between the electronic device 110 and the access point being in the second frequency band and the communication channel of the P2P connection with the peripheral device being in the first frequency band, the processor 210 may connect the first filter and the first antenna, and may connect the second filter and the second antenna.

In response to the communication channel between the electronic device 110 and the access point being in the second frequency band and the communication channel of the P2P connection with the peripheral device being in the third frequency band, the processor 210 may not connect the first filter and the first antenna, and may connect the second filter and the second antenna.

In response to the communication channel between the electronic device 110 and the access point being in the first frequency band or the third frequency band, the processor 210 may control the connection between the first antenna and the first filter and the connection between the second antenna and the second filter to prevent/block the RF signal from passing through the first filter and the second filter.

In response to the communication channel between the electronic device 110 and the access point being in the first frequency band or the third frequency band, and the communication channel between the electronic device 110 and the access point and the communication channel of the P2P connection with the peripheral device being identical to each other, the processor 210 may perform communication with the access point and the peripheral device according to an SCC scheme.

In response to the communication channel between the electronic device 110 and the access point being in the first frequency band or the third frequency band, and the communication channel between the electronic device 110 and the access point and the communication channel of the P2P connection with the peripheral device being different from each other, the processor 210 may perform communication with the access point and the peripheral device according to an SCC scheme.

When the electronic device 110 performs Wi-Fi communication with the access point in the second frequency band including the 6 GHz frequency band and performs P2P communication with the peripheral device in the first frequency band including the 5 GHz frequency band through the above-described control, it may be possible to improve communication performance by reducing an impact of interference on the Wi-Fi communication and the P2P communication. Controlling connections between filters and antennas by the processor 210 according to the communication channel between the electronic device 110 and the access point and the communication channel of the P2P connection with the peripheral device will be described in detail with reference to FIG. 5.

Figure 3:
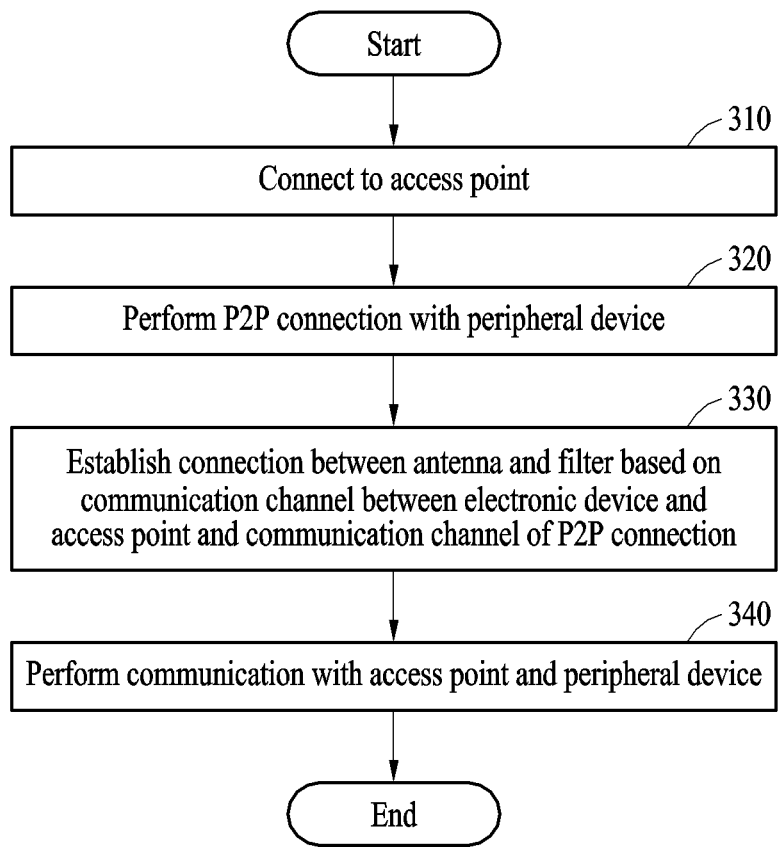
FIG. 3 is a flowchart illustrating an example method of operating an electronic device according to various embodiments.

FIG. 3 is a flowchart illustrating an example method of operating an electronic device according to various embodiments.

In the following example embodiments, operations may be performed sequentially, but not necessarily sequentially. For example, the order of the operations may change, and the operations may be performed in parallel. Operations 310 to 340 may be performed by at least one component of an electronic device (e.g., the electronic device 110 of FIGS. 2A and 2B).

Referring to FIG. 3, in operation 310, the electronic device may be connected to an access point. The electronic device may be connected to the access point through a communication channel in one of a first frequency band including a 5 GHz frequency band, a second frequency band including a 6 GHz frequency band, and a third frequency band including a 2.4 GHz frequency band.

The electronic device may receive communication channel information from the access point, and may determine a communication channel for performing Wi-Fi communication based on the received communication channel information. The electronic device may identify communication channels supported by the access point through the communication channel information, and may determine a communication channel to be connected to the access point according to a selection by a user or a set priority from among the supported communication channels.

In operation 320, the electronic device may perform a P2P connection with a peripheral device. The electronic device may receive a P2P connection request from the peripheral device, or the electronic device may transmit a request for P2P connection to the peripheral device. In order to perform P2P connection, the electronic device may search for nearby devices available for P2P connection, and exchange device information with the devices available for P2P connection. The device information may include wireless connection information stored in the electronic device and the peripheral device and information on a supported concurrent connection scheme (e.g., DBDC, SCC, and MCC).

In operation 330, the electronic device may establish a connection between an antenna (e.g., a first antenna 572 and a second antenna 574 of FIG. 5) and a filter (e.g., a first filter 552 and a second filter 554 of FIG. 5) included in a communicator based on a communication channel between the electronic device and the access point and a communication channel of the P2P connection. In response to wireless communication with the access point and wireless communication with the peripheral device being performed simultaneously, the electronic device may set a connection relationship between the antenna and the filter to reduce interference. For example, in response to the communication channel between the electronic device and the access point being in the second frequency band including the 6 GHz frequency band and the communication channel of the P2P connection being in the first frequency band including the 5 GHz frequency band, the electronic device may reduce interference between the wireless communication with the access point and the wireless communication with the peripheral device by controlling a connection relationship to enable an RF signal transmitted and received through a first antenna to pass through a first filter that allows an RF signal in the 5 GHz frequency band or lower to pass therethrough and to enable an RF signal transmitted and received through a second antenna to pass through a second filter that allows an RF signal in the 6 GHz frequency band or higher to pass therethrough. Setting a connection relationship between an antenna and a filter will be described in detail with reference to FIG. 5.

In operation 340, the electronic device may perform the communication with the access point and the peripheral device based on a set connection between the first antenna and the first filter and a set connection between the second antenna and the second filter. The electronic device may perform DBDC with the access point and the peripheral device based on the connection relationship between the antenna and the filter established according to the communication channel between the electronic device and the access point and the communication channel of the P2P connection. The electronic device may communicate simultaneously with the access point and the peripheral device over different communication channels through DBDC.

Figure 4:
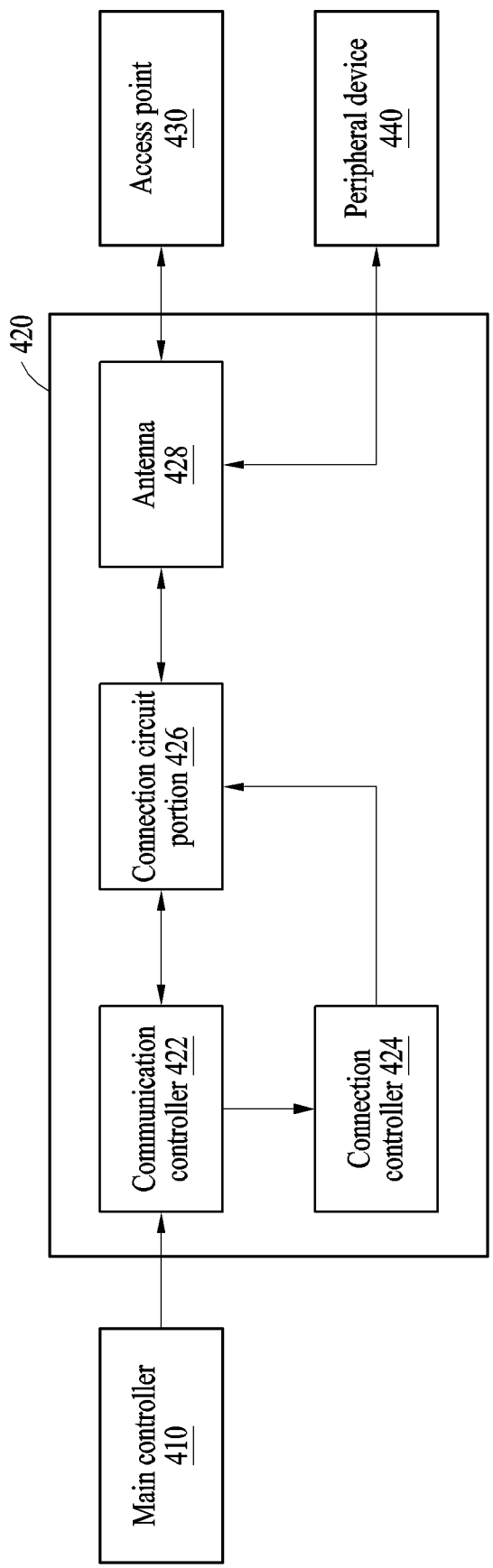
FIG. 4 is a block diagram illustrating an example configuration of a communicator of an electronic device according to various embodiments.

FIG. 4 is a block diagram illustrating an example configuration of a communicator of an electronic device according to various embodiments.

Referring to FIG. 4, a main controller (e.g., the processor 210 of FIG. 2A) of an electronic device (e.g., the electronic device 110 of FIG. 2A) may include various processing circuitry and control an operation of a communicator 420 of the electronic device. The communicator 420 may include a communication controller (e.g., including processing/control circuitry) 422, a connection controller (e.g., including processing/control circuitry) 424, a connection circuit portion 426, and an antenna 428. The communication controller 422 may include various processing and/or control circuitry and control an overall operation of the communicator 420 under the control of the main controller 410. The communication controller 422 may transfer, to the connection circuit portion 426, an RF signal to be transmitted to an external device, and may receive, from the connection circuit portion 426, an RF signal received through the antenna 428. The communication controller 422 also may transfer access point connection information and P2P connection information to the connection controller 424.

The connection circuit portion 426 may include various circuitry including, for example, a first filter (e.g., the first filter 552 of FIG. 5) that allows an RF signal in a first frequency band to pass therethrough, a second filter (e.g., the second filter 554 of FIG. 5) that allows an RF signal in a second frequency band to pass therethrough, first switches (e.g., the first switches 542 and 544 of FIG. 5) that control a connection of a signal transmission path including the first filter, and second switches (e.g., the second switches 546 and 548 of FIG. 5) that control a connection of a signal transmission path including the second filter. The first filter may be an LPF that allows an RF signal in the first frequency band or lower to pass therethrough, and the second filter may be a HPF that allows an RF signal in the second frequency band or higher to pass therethrough.

The antenna 428 may include a plurality of antennas, and the communicator 420 may perform wireless communication simultaneously with an access point 430 and a peripheral device 440 through the plurality of antennas over different communication channels. The communicator 420 may support wireless communication of a communication channel in a 2.4 GHz frequency band, a communication channel in a 5 GHz frequency band, and a communication channel in a 6 GHz frequency band.

In an example embodiment, in response to the electronic device performing a P2P connection, the main controller 410 may transmit a request for performing a P2P connection operation to the communication controller 422, and the communication controller 422 may perform the P2P connection operation. The connection controller 424 may receive the access point connection information and the P2P connection information from the communication controller 422, and may generate a connection control signal to control the connection circuit portion 426 based on the access point connection information and the P2P connection information. The connection control signal may be implemented as a general-purpose input/output (GPIO) control signal.

The access point connection information may include, for example, information on an access point connected to the electronic device and information on a communication channel for performing Wi-Fi communication. The P2P connection information may include, for example, information on a peripheral device for performing a P2P connection and information on a communication channel for performing a P2P connection. The connection controller 424 may generate the connection control signal based on the communication channel between the electronic device and the access point and the communication channel of the P2P connection, and may control a connection relationship between the first switches and the second switches included in the connection circuit portion 426 through the generated connection control signal.

Figure 5:
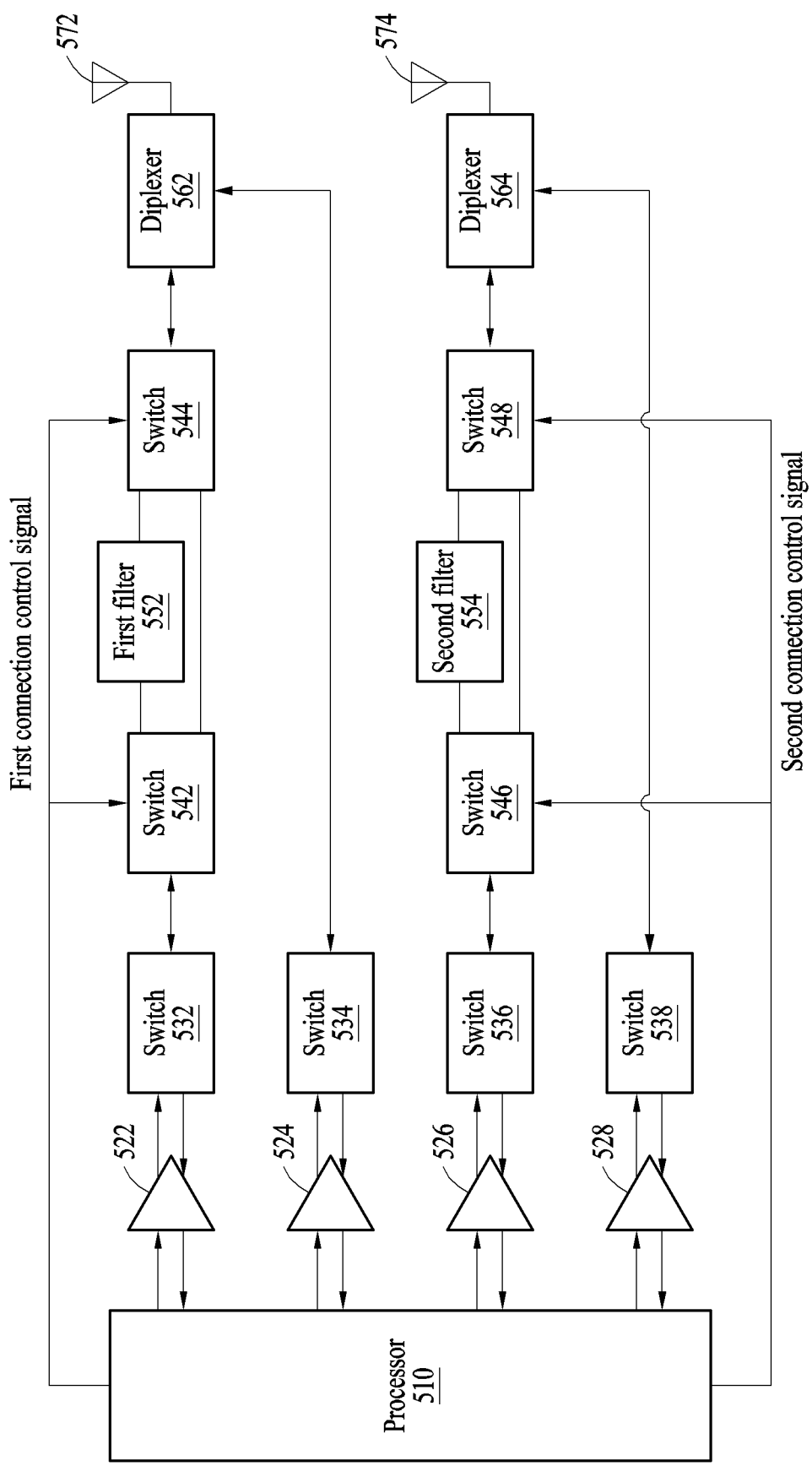
FIG. 5 is a block diagram illustrating an example configuration of a communicator of an electronic device according to various embodiments.

FIG. 5 is a block diagram illustrating an example configuration of a communicator of an electronic device according to various embodiments.

Referring to FIG. 5, a circuit for implementing a communicator (e.g., the communicator 240 of FIG. 2A) of an electronic device may include a processor (e.g., including processing circuitry) 510, amplifiers 522, 524, 526, and 528, switches 532, 534, 536, 538, 542, 544, 546, and 548, the first filter 552, the second filter 554, diplexers 562 and 564, and antennas 572 and 574.

The processor 510 may include various processing circuitry and control an operation of the communicator, transfer, to the amplifiers 522, 524, 526, and 528, an RF signal to be transmitted, and receive an RF signal received through the antennas 572 and 574 from the amplifiers 522, 524, 526, and 528. In addition, the processor 510 may control a connection of the first switches 542 and 544 and a connection of the second switches 546 and 548 based on a connection control signal. The processor 510 may generate a first connection control signal for controlling the first switches 542 and 544, and generate a second connection control signal for controlling the second switches 546 and 548.

The amplifiers 522, 524, 526, and 528 may amplify a transmitted and received RF signal. For example, each of the amplifiers 522 and 526 may be an amplifier (e.g., a low noise amplifier (LNA)) for a 2.4 GHz frequency band, and each of the amplifiers 524 and 528 may be an amplifier (e.g., an LNA) for a 5 GHz frequency band.

One or more of the switches 532, 534, 536, 538, 542, 544, 546, and 548 may include, for example, a single pole double through (SPDT) switch. An SPDT switch may refer, for example, to a switch having one pole and two throws corresponding to an on-off line. One or more of the switches 532, 534, 536, and 538 may select a transmission path or a reception path. One or more of the switches 532, 534, 536, and 538 may include a first terminal connected to a transmission path, a second terminal connected to a reception path, and a third terminal for transmitting a signal to the first terminal and receiving a signal from the second terminal. The switch 532 may be connected to the amplifier 522 and the switch 542, and the switch 534 may be connected to the amplifier 524 and the diplexer 562. The switch 536 may be connected to the amplifier 526 and the switch 546, and the switch 538 may be connected to the amplifier 529 and the diplexer 564. The first switches 542 and 544 may control a connection of the signal transmission path including the first filter 552 based on a first connection control signal generated by the processor 510. The first switches 546 and 548 may control a connection of the signal transmission path including the second filter 554 based on a second connection control signal generated by the processor 510.

The first filter 552 and the second filter 554 may allow an RF signal in a predetermined frequency band to pass therethrough and cut off an RF signal in other frequency bands. For example, the first filter 552 may be, for example, an LPF that allows an RF signal in a 5 GHz frequency band or lower to pass therethrough, and the second filter 554 may be a HPF that allows an RF signal in a 6 GHz frequency band or higher to pass therethrough. The first filter 552 may be connected to the first switch 542 and the first switch 544, and the second filter 554 may be connected to the second switch 546 and the second switch 548.

The diplexers 562 and 564 may separate a transmitted signal and a received signal. The diplexers 562 and 564 may transfer, to the antennas 572 and 574, an RF signal to be transmitted, and transfer a received RF signal to a reception path toward the processor 510. In addition, the diplexers 562 and 564 may branch an RF signal to different paths according to a frequency band.

The antennas 572 and 574 may transmit an RF signal to an external device (e.g., the access point 120 and/or the peripheral device 130 of FIG. 1) or receive an RF signal from the external device. The antennas 572 and 574 may be array antennas, for example.

In response to performing a P2P connection with a peripheral device, the processor 510 may control a connection between the first antenna 572 and the first filter 552 and a connection between the second antenna 574 and the second filter 554 based on a communication channel between the electronic device and an access point and a communication channel of the P2P connection. The processor 510 may control whether to pass an RF signal through a signal transmission path passing through a filter or a signal transmission path not passing through a filter by controlling a connection relationship of the first and second switches 542, 544, 546, and 548 through a connection control signal. A control method in which the processor 510 controls the connection relationship between the first and second switches 542, 544, 546, and 548 through the connection control signal will be described in greater detail below with reference to FIG. 6.

Figure 6:
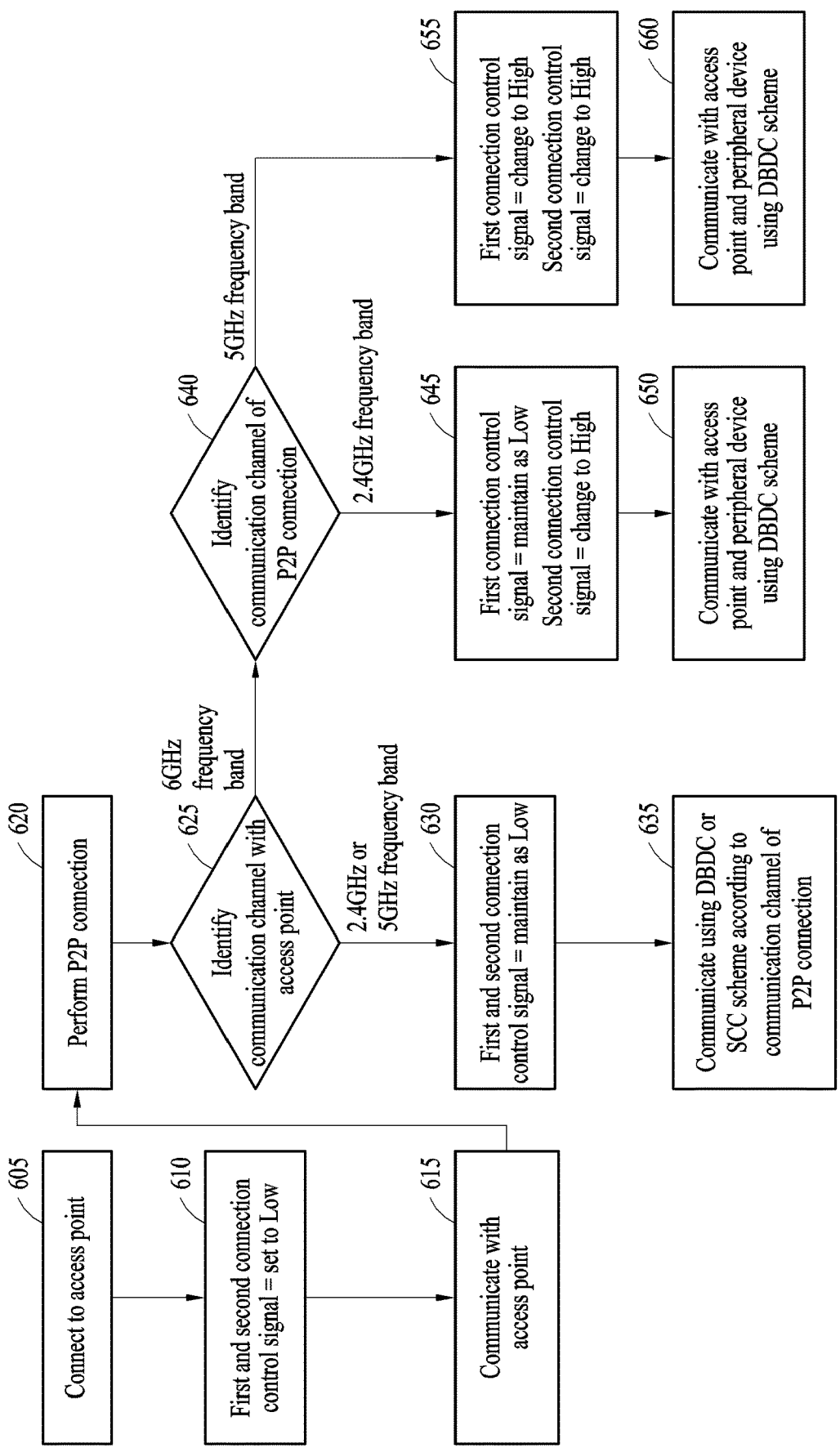
FIG. 6 is a diagram illustrating example method of controlling a communicator according to a communication channel according to various embodiments.
Figure 7A:
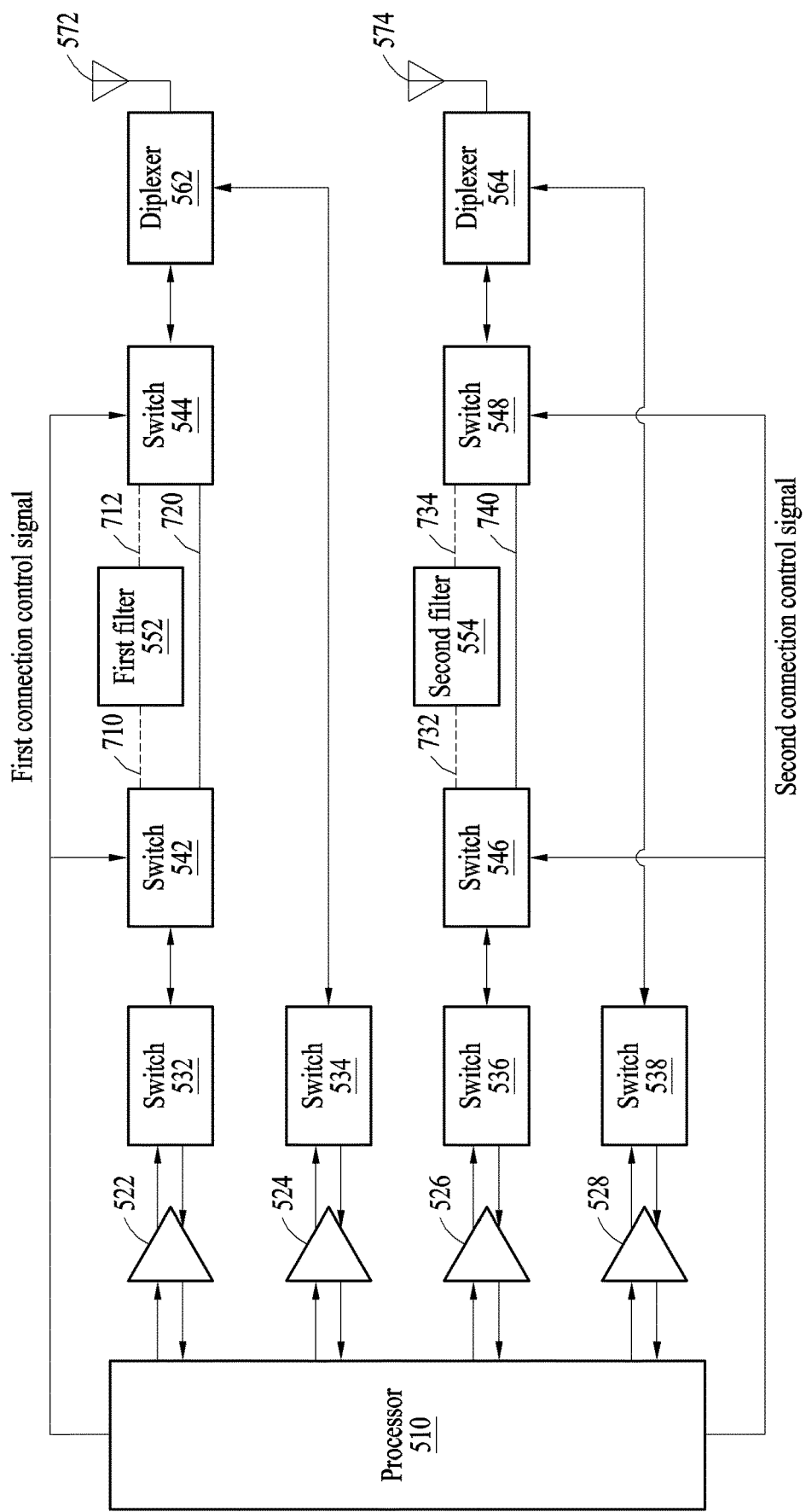
FIGS. 7A, 7B and 7C are diagrams illustrating an example connection relationship between a filter and an antenna according to a communication channel with an access point and a communication channel of a peer-to-peer (P2P) connection according to various embodiments.
Figure 7B:
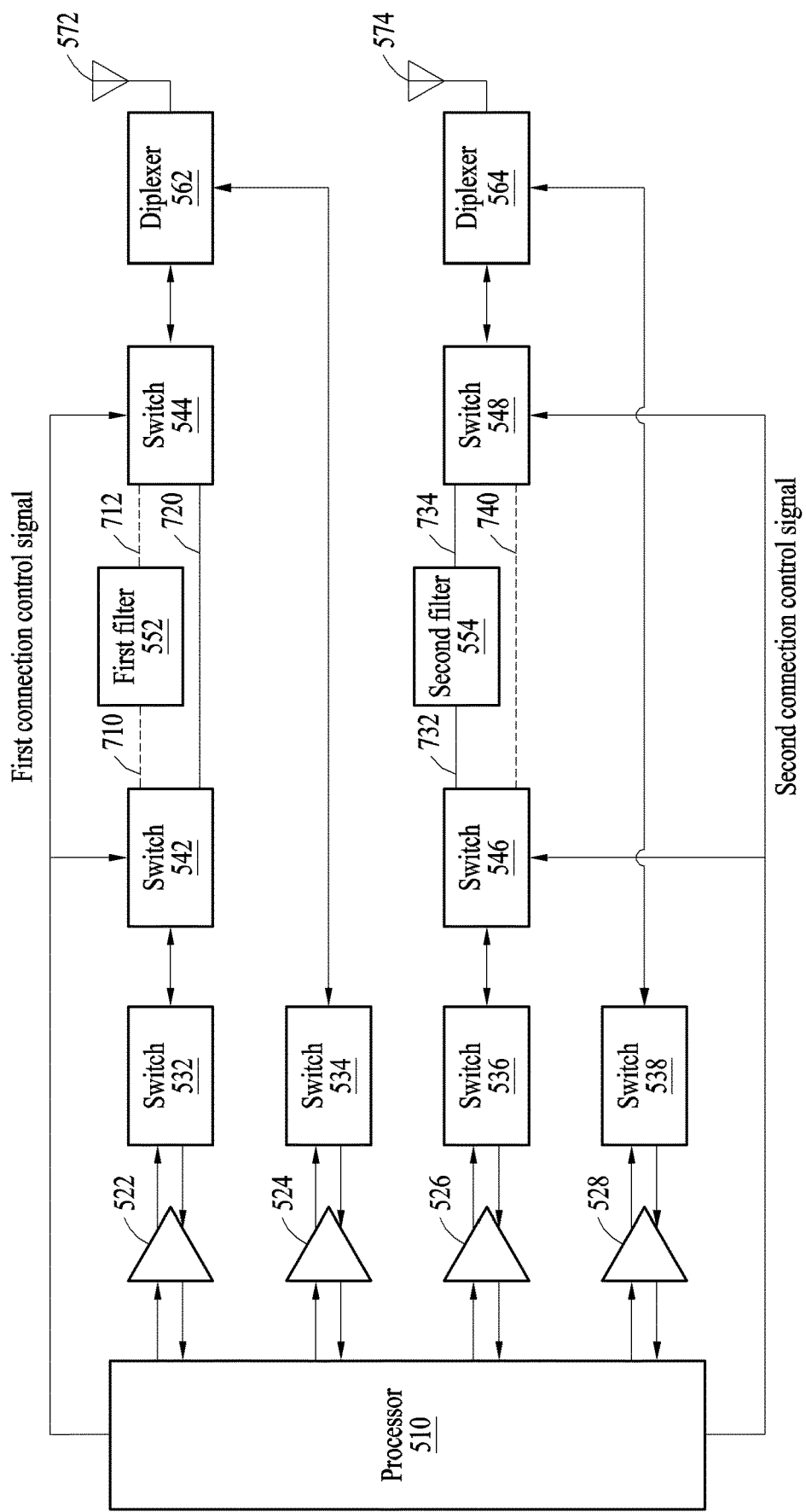
Figure 7C:
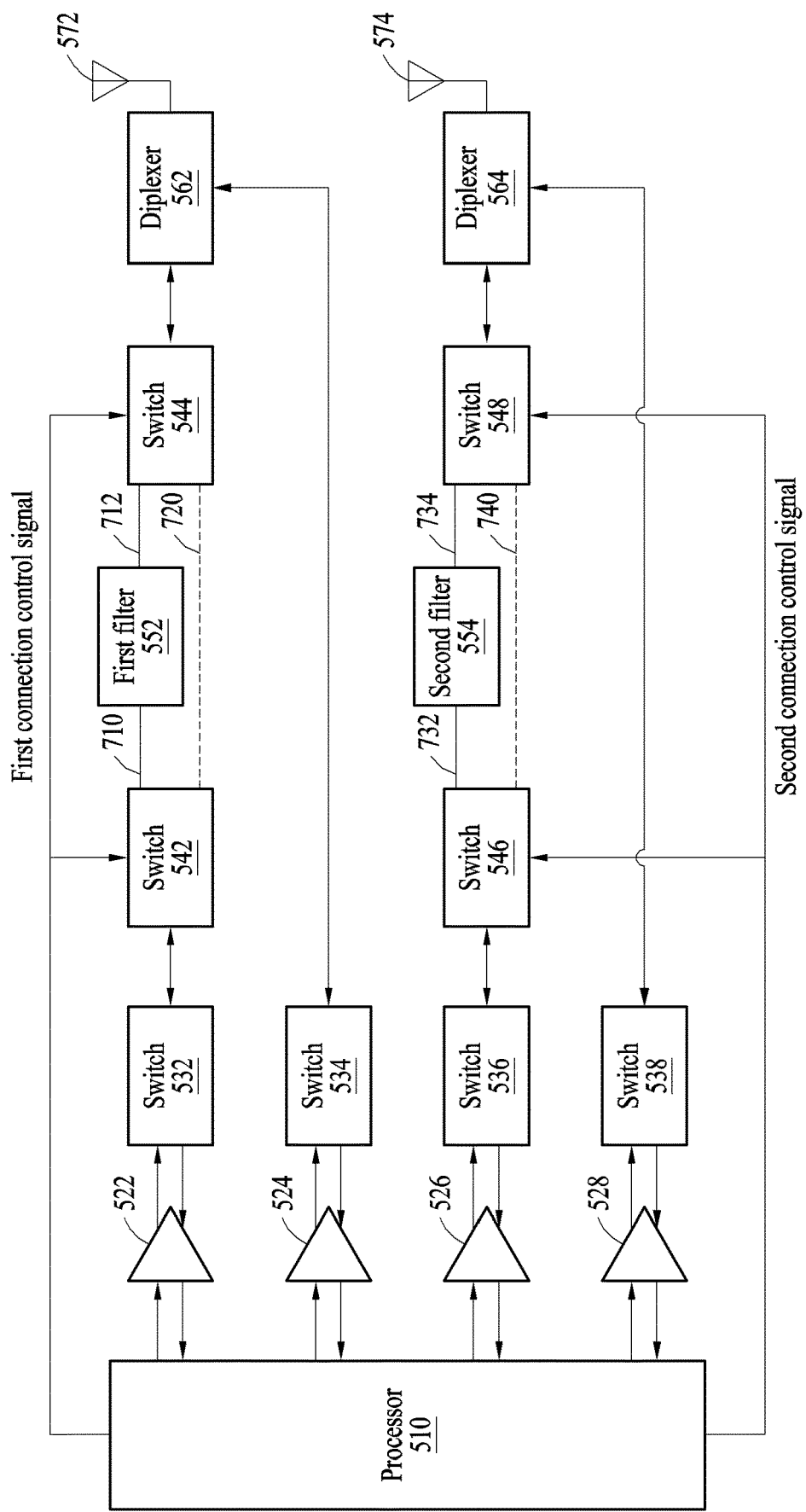

FIG. 6 is a diagram illustrating an example method of controlling a communicator according to a communication channel according to various embodiments. FIGS. 7A, 7B and 7C are diagrams illustrating an example connection relationship between a filter and an antenna according to a communication channel with an access point and a communication channel of a P2P connection according to various embodiments.

Referring to FIG. 6, in operation 605, an electronic device (e.g., the electronic device 110 of FIGS. 2A and 2B) may establish a connection to an access point. In operation 610, in response to connecting to the access point, the electronic device may control the first switches 542 and 544 and the second switches 546 and 548 to transmit an RF signal to a signal transmission path not passing through the first filter 552 and the second filter 554 by setting first and second connection control signals to "Low" regardless of whether a communication channel is in a 2.4 GHz, 5 GHz, or 6 GHz frequency band. The electronic device may set the connection between the first antenna 572 and the first filter 552 and the connection between the second antenna 574 and the second filter 554 to prevent/block an RF signal from passing through the first filter 552 and the second filter 554.

In operation 615, the electronic device may communicate with the access point based on the signal transmission path set by the first and second connection control signals. The electronic device may communicate with the access point through one of communication channels in the 2.4 GHz, 5 GHz, and 6 GHz frequency bands respectively.

In operation 620, the electronic device may establish a P2P connection with a peripheral device. The electronic device may receive a P2P connection request (e.g., a smart view connection request) from a peripheral device. In operation 625, the electronic device may identify a communication channel between the electronic device and the access point in response to the P2P connection with the peripheral device.

In response to the communication channel between the electronic device and the access point being in the 5 GHz frequency band or the 2.4 GHz frequency band, in operation 630, the electronic device may maintain the value (="Low") of the first and second connection control signals set in operation 610. Accordingly, the electronic device may control the connection between the first antenna 572 and the first filter 552 and the connection between the second antenna 574 and the second filter 554 to prevent/block an RF signal from passing through the first filter 552 and the second filter 554.

FIG. 7A illustrates a case in which the first and second connection control signals are set to "Low". Referring to FIG. 7A, in response to the first connection control signal being set to "Low", a connection 710 between the first switch 542 and the first filter 552 and a connection 712 between the first filter 552 and the first switch 544 are cut off, and a connection 720 between the first switch 542 and the first switch 544 is established. Accordingly, an RF signal transmitted and received through the first antenna 572 does not pass through the first filter 552. In response to the second connection control signal being set to "Low", a connection 732 between the second switch 546 and the second filter 554 and a connection 734 between the second filter 554 and the second switch 548 are cut, and a connection 740 between the second switch 546 and the second switch 548 is established. Accordingly, an RF signal transmitted and received through the second antenna 574 does not pass through the second filter 554.

Referring back to FIG. 6, in operation 635, the electronic device may communicate with the access point and the peripheral device using an SCC scheme or a DBDC scheme according to a communication channel of the P2P connection. In response to the communication channel between the electronic device and the access point and the communication channel of the P2P connection being identical to each other, the electronic device may perform communication with the access point and the peripheral device according to the SCC scheme. In response to the communication channel between the electronic device and the access point and the communication channel of the P2P connection being different from each other, the electronic device may perform communication with the access point and the peripheral device according to the DBDC scheme.

In response to the communication channel between the electronic device and the access point corresponding to a 6 GHz frequency band, the electronic device may identify the communication channel of the P2P connection in operation 640. The electronic device may establish a connection between the first antenna 572 and the first filter 552 according to the communication channel of the P2P connection. For example, the electronic device may control a signal transmission path of an RF signal differently according to whether the communication channel of the P2P connection is in a 2.4 GHz or 5 GHz frequency band.

If the communication channel of the P2P connection corresponds to the 2.4 GHz frequency band, in operation 645, the electronic device may maintain the first connection control signal at "Low" and change a second connection control signal to "High". By setting the first and second connection control signals, the electronic device may not connect the first filter 552 and the first antenna 572, and may connect the second filter 554 and the second antenna 574.

FIG. 7B illustrates a case in which the first connection control signal is set to "Low" and the second connection control signal is set to "High". Referring to FIG. 7B, in response to the first connection control signal being set to "Low", the connection 710 between the first switch 542 and the first filter 552 and the connection 712 between the first filter 552 and the first switch 544 are cut, and the connection 720 between the first switch 542 and the first switch 544 is established. Accordingly, the RF signal transmitted and received through the first antenna 572 does not pass through the first filter 552. In response to the second connection control signal being set to "High", the connection 732 between the second switch 546 and the second filter 554 and the connection 734 between the second filter 554 and the second switch 548 are established, and the connection 740 between the second switch 546 and the second switch 548 is cut. Accordingly, the RF signal transmitted and received through the second antenna 574 passes through the second filter 554.

Referring back to FIG. 6, in operation 650, the electronic device may communicate with the access point and the peripheral device using the DBDC scheme. The electronic device may communicate with the access point over a communication channel in the 6 GHz frequency band, and may communicate with the peripheral device over a communication channel in the 2.4 GHz frequency band.

In response to the communication channel of the P2P connection corresponding to the 5 GHz frequency band, in operation 655, the electronic device may change the first connection control signal to "High" and change the second connection control signal to "High". By setting the first and second connection control signals, the electronic device may connect the first filter 552 and the first antenna 572, and connect the second filter 554 and the second antenna 574.

FIG. 7C illustrates a case in which the first and second connection control signals are set to "High". Referring to FIG. 7C, in response to the first connection control signal being set to "High", the connection 710 between the first switch 542 and the first filter 552 and the connection 712 between the first filter 552 and the first switch 544 are established, and the connection 720 between the first switch 542 and the first switch 544 is cut. Accordingly, the RF signal transmitted and received through the first antenna 572 passes through the first filter 552. In response to the second connection control signal being set to "High", the connection 732 between the second switch 546 and the second filter 554 and the connection 734 between the second filter 554 and the second switch 548 are established, and the connection 740 between the second switch 546 and the second switch 548 is cut. Accordingly, the RF signal transmitted and received through the second antenna 574 passes through the second filter 554.

Referring back to FIG. 6, in operation 660, the electronic device may communicate with the access point and the peripheral device using the DBDC scheme. The electronic device may communicate with the access point over a communication channel in the 6 GHz frequency band, and may communicate with the peripheral device over a communication channel in the 5 GHz frequency band. In response to performing DBDC in the 6 GHz frequency band and the 5 GHz frequency band, the electronic device may reduce interference between the 6 GHz and 5 GHz frequency bands by filtering an RF signal using the first filter 552 and the second filter 554.

Figure 8:
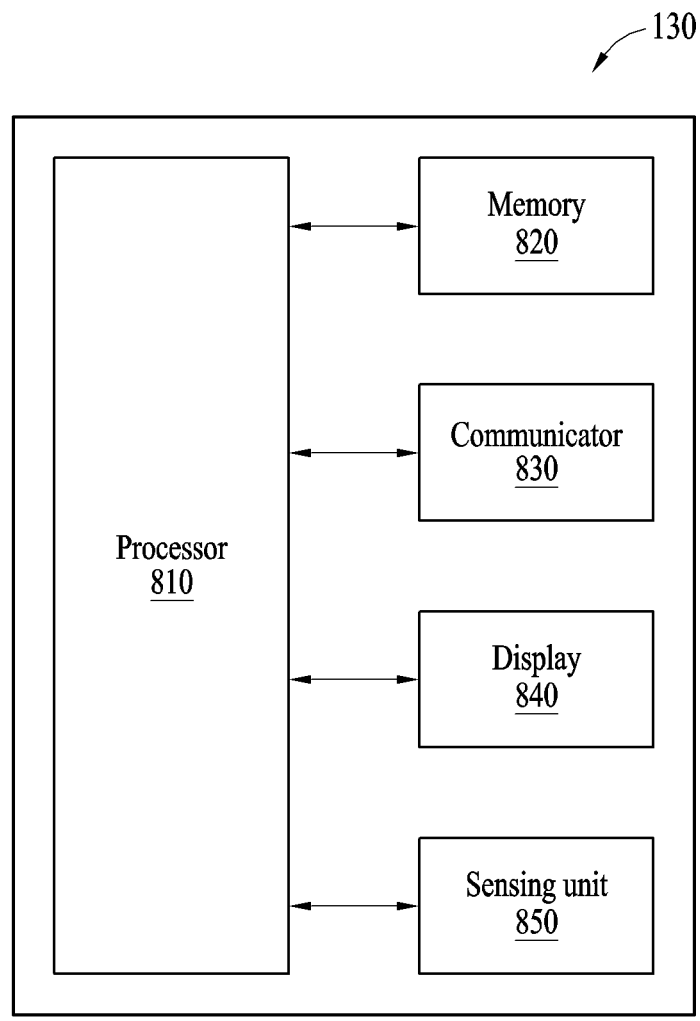
FIG. 8 is a block diagram illustrating an example configuration of a peripheral device according to various embodiments.

FIG. 8 is a block diagram illustrating an example configuration of a peripheral device according to various embodiments.

The peripheral device 130 may include at least some components of the electronic device 110 illustrated in FIGS. 2A and 2B.

As illustrated in FIG. 8, the peripheral device 130 may include a processor (e.g., including processing circuitry) 810, a memory 820, a communicator (e.g., including communication circuitry) 830, a display 840, and a sensing unit (e.g., including at least one sensor) 850. However, not all of the components illustrated in FIG. 8 are essential components of the peripheral device 130. The peripheral device 130 may be implemented with more components than the components illustrated in FIG. 8, and the peripheral device 130 may be implemented with fewer components than the components illustrated in FIG. 8.

The display 840 of the peripheral device 130 may generate a driving signal by converting an image signal, a data signal, an OSD signal, and a control signal processed by the processor 810.

In addition, the display 840 may display content (e.g., a moving image) input through the communicator 830 or an I/O unit (not shown). The display 840 may output an image stored in the memory 820 under the control of the processor 810.

According to an example embodiment, the memory 820 of the peripheral device 130 may store a program for processing and controlling the processor 810, and store data input to or output from the peripheral device 130.

Normally, the processor 810 controls an overall operation of the peripheral device 130. For example, the processor 810 may generally control the sensing unit 850, the communicator 830, and the like by executing programs stored in the memory 820. The processor 810 may control an operation of the peripheral device 130 to perform functions of the peripheral device 130 described with reference to FIGS. 1 to 7.

The processor 810 may include various processing circuitry including, for example, one or more processors. The one or more processors may include a general-purpose processor, such as a central processing unit (CPU), an application processor (AP), or a digital signal processor (DSP), or a graphic processor, such as a GPU or a vision processing unit (VPU). The one or more processors perform control to process input data according to a predefined operation rule stored in the memory 820.

According to an example embodiment, the processor 810 may receive a wireless signal transmitted by the electronic device 110 through the communicator 830.

In addition, the processor 810 may receive a request for identification information of the peripheral device 130 from the electronic device 110 through the communicator 830. The processor 810 may perform control to transmit the identification information of the peripheral device 130 to the electronic device 110 through the communicator 830.

In addition, the processor 810 may perform control to transmit a sensing value detected by the sensing unit 850 to the electronic device 110 through the communicator 830.

The processor 810 may receive a request for state information on an operation running on the peripheral device 130 through the communicator 830. The processor 810 may generate the state information on the currently executed operation. The processor 810 may perform control to transmit the state information on the currently executed operation to the electronic device 110 through the communicator 830.

The memory 820 may include at least one type of storage media of a flash memory type, a hard disk type, a multimedia card micro type, a card type memory (e.g., an SD or XE memory), RAM, SRAM, ROM, EEPROM, PROM, a magnetic memory, a magnetic disk, and an optical disk.

In addition, the communicator 830 may include various communication circuitry including, for example, one or more components that allow the peripheral device 130 to communicate with an external device. For example, the communicator 830 may include a short-range wireless communicator (not shown), a mobile communicator (not shown), and a broadcast receiver (not shown).

The short-range wireless communicator may include a Bluetooth communicator, a BLE communicator, a near field communicator, a WLAN (Wi-Fi) communicator, a Zigbee communicator, an infrared data association (IrDA) communicator, a Wi-Fi direct (WFD) communicator, an ultra-wideband (UWB) communicator, and an Ant+ communicator, but the examples are not limited thereto.

The peripheral device 130 may perform P2P communication with the electronic device 110 through the short-range wireless communicator. The peripheral device 130 may transmit a P2P connection request to the electronic device 110 or receive a P2P connection request from the electronic device 110. The peripheral device 130 may perform the P2P communication with the electronic device 110 through, for example, a communication channel in a 2.4 GHz frequency band or a 5 GHz frequency band.

The mobile communicator transmits and receives a wireless signal to and from at least one of a base station, an external terminal, and a server on a mobile communication network. The wireless signal may include various types of data according to transmission and reception of a voice call signal, a video communication call signal, or a text or multimedia message.

The broadcast receiver receives a broadcast signal and/or information associated with broadcast from an external device through a broadcast channel. The broadcast channel may include a satellite channel and a terrestrial channel. Depending on an implementation of an example embodiment, the peripheral device 130 may not include the broadcast receiver.

The sensing unit 850 may include at least one sensor and sense a state of the peripheral device 130 or a state around the peripheral device 130, and provide the information obtained by sensing to the processor 810.

The sensing unit 850 may include at least one of a magnetic sensor, an acceleration sensor, a temperature/humidity sensor, an IR sensor, a gyroscope sensor, a position sensor (e.g., a GPS), a light sensor, a proximity sensor, and an RGB sensor (e.g., an illuminance sensor), however, the examples are not limited thereto. Since one skilled in the art may intuitively infer a function of each sensor from its name, a detailed description thereof is omitted.

The example embodiments described herein may be implemented using a hardware component, a software component and/or a combination thereof. A processing device may be implemented using one or more general-purpose or special-purpose computers, such as, for example, a processor, a controller and an arithmetic logic unit (ALU), a digital signal processor (DSP), a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be embodied permanently or temporarily in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described devices may be configured to act as one or more software modules in order to perform the operations of the above-described examples, or vice versa.

As described above, although the examples have been described with reference to the drawings, a person skilled in the art may apply various technical modifications and variations based thereon. For example, suitable results may be achieved if the described techniques are performed in a different order and/or if components in a described system, architecture, device, or circuit are combined in a different manner and/or replaced or supplemented by other components or their equivalents.

Therefore, the scope of the disclosure is not limited by the detailed description, and includes the claims and their equivalents, and all variations within the scope of the claims and their equivalents are to be construed as being included in the disclosure.

As such, while the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device, comprising:
   a processor including processing circuitry;
   a memory configured to store at least one instruction executable by the processor; and
   a communicator comprising a first antenna, a second antenna, a first filter configured to allow a radio frequency (RF) signal in a first frequency band to pass therethrough, and a second filter configured to allow an RF signal in a second frequency band to pass therethrough, wherein:
   the processor, in response to the at least one instruction being executed, is configured to:
     connect to an access point using one of the first frequency band, the second frequency band, and a third frequency band; and
     control a connection between the first antenna and the first filter and a connection between the second antenna and the second filter based on a communication channel between the electronic device and the access point and a communication channel of a peer-to-peer (P2P) connection, in response to performing the P2P connection with a peripheral device,
   the second frequency band is a frequency band higher than the first frequency band,
   the third frequency band is a frequency band lower than the first frequency band, and
   the processor is configured to, in response to the communication channel between the electronic device and the access point being in the second frequency band and the communication channel of the P2P connection being in the third frequency band:
     not connect the first filter and the first antenna; and
     connect the second filter and the second antenna.

2. The electronic device of claim 1, wherein the processor is configured to, in response to the communication channel between the electronic device and the access point being in the second frequency band and the communication channel of the P2P connection being in the first frequency band:
   connect the first filter and the first antenna; and
   connect the second filter and the second antenna.

3. The electronic device of claim 1, wherein the processor is configured to, in response to the communication channel between the electronic device and the access point being in the first frequency band or the third frequency band, control a connection between the first antenna and the first filter and a connection between the second antenna and the second filter to block an RF signal from passing through the first filter and the second filter.

4. The electronic device of claim 1, wherein the processor is configured to, in response to connecting to the access point before performing the P2P connection with the peripheral device, control the connection between the first antenna and the first filter and the connection between the second antenna and the second filter to block an RF signal from passing through the first filter and the second filter.

5. The electronic device of claim 1, wherein the processor is configured to, in response to the communication channel between the electronic device and the access point being in the first frequency band or the third frequency band, and the communication channel between the electronic device and the access point and the communication channel of the P2P connection being identical to each other, perform communication with the access point and the peripheral device according to a single channel concurrency (SCC) scheme.

6. The electronic device of claim 1, wherein the processor is configured to, in response to the communication channel between the electronic device and the access point being in the first frequency band or the third frequency band, and the communication channel between the electronic device and the access point and the communication channel of the P2P connection being different from each other, perform communication with the access point and the peripheral device according to a dual-band dual-concurrent (DBDC) scheme.

7. The electronic device of claim 1, wherein
the first frequency band comprises a 5 gigahertz (GHz) frequency band,
the second frequency band comprises a 6 GHz frequency band, and
the third frequency band comprises a 2.4 GHz frequency band.

8. The electronic device of claim 1, wherein the communicator is configured to simultaneously perform wireless communication using two of the first frequency band, the second frequency band, and the third frequency band.

9. The electronic device of claim 1,
wherein the first filter comprises a low pass filter (LPF) configured to allow an RF signal in the first frequency band or lower to pass therethrough.

10. The electronic device of claim 1, wherein the second filter comprises a high pass filter (HPF) configured to allow an RF signal in the second frequency band or higher to pass therethrough.

11. The electronic device of claim 1, wherein
the communicator comprises:
at least one first switch configured to control a connection of a signal transmission path comprising the first filter; and
at least one second switch configured to control a connection of a signal transmission path comprising the second filter, and
the processor is configured to control a connection of the at least one first switch and a connection of the at least one second switch based on a connection control signal.

12. A method of operating an electronic device comprising a first antenna, a second antenna, a first filter configured to allow a radio frequency (RF) signal in a first frequency band to pass therethrough, and a second filter configured to allow an RF signal in a second frequency band to pass therethrough, the method comprising:
connecting to an access point using one of a first frequency band, a second frequency band, and a third frequency band;
performing a peer-to-peer (P2P) connection with a peripheral device;
setting a connection between the first antenna and the first filter and a connection between the second antenna and the second filter based on a communication channel between the electronic device and the access point and a communication channel of the P2P connection; and
performing communication with the access point and the peripheral device based on the set connection between the first antenna and the first filter and the set connection between the second antenna and the second filter, wherein
the second frequency band is a frequency band higher than the first frequency band, and
the third frequency band is a frequency band lower than the first frequency band,
wherein the setting of the connection comprises, in response to the communication channel between the electronic device and the access point being in the second frequency band and the communication channel of the P2P connection being in the third frequency band:
not connecting the first filter and the first antenna; and
connecting the second filter and the second antenna.

13. The method of claim 12, wherein the setting of the connection comprises:
identifying the communication channel between the electronic device and the access point; and
setting the connection between the first antenna and the first filter according to the communication channel of the P2P connection in response to the communication channel between the electronic device and the access point corresponding to the second frequency band.

14. The method of claim 12, wherein the setting of the connection comprises, in response to the communication channel between the electronic device and the access point being in the second frequency band and the communication channel of the P2P connection being in the first frequency band:
connecting the first filter and the first antenna; and
connecting the second filter and the second antenna.

15. The method of claim 12, wherein the setting of the connection comprises, in response to the communication channel between the electronic device and the access point being in the first frequency band or the third frequency band, controlling the connection between the first antenna and the first filter and the connection between the second antenna and the second filter to block an RF signal from passing through the first filter and the second filter.

16. The method of claim 12, wherein the connecting to the access point comprises setting the connection between the first antenna and the first filter and the connection between the second antenna and the second filter to block an RF signal from passing through the first filter and the second filter.

17. The method of claim 12, wherein
the first frequency band comprises a 5 gigahertz (GHz) frequency band,
the second frequency band comprises a 6 GHz frequency band, and
the third frequency band comprises a 2.4 GHz frequency band.

18. A non-transitory computer-readable storage medium storing instructions that, when executed by a processor, cause the processor to perform the operations of claim 12.

* * * * *